United States Patent [19]

Graves

[11] Patent Number: 5,288,121
[45] Date of Patent: Feb. 22, 1994

[54] AUTOMOBILE TRIM STRIP AND CARPET RETAINING CLIP

[75] Inventor: Gregory A. Graves, Troy, Mich.

[73] Assignee: Grant Industries, Inc., Fraser, Mich.

[21] Appl. No.: 23,065

[22] Filed: Feb. 25, 1993

[51] Int. Cl.$^5$ ............................ B32B 3/02; B60N 3/04
[52] U.S. Cl. ...................... 296/1.1; 296/209; 296/97.23; 16/4; 49/490.1
[58] Field of Search ............ 296/209, 97.23, 1.1; 16/4, 1, 8; 49/485, 490

[56] References Cited

U.S. PATENT DOCUMENTS

| | | | |
|---|---|---|---|
| 2,742,984 | 4/1956 | Bedford, Jr. | 52/716.7 |
| 2,837,184 | 6/1958 | Fernberg | 52/716.7 |
| 2,976,972 | 3/1961 | Raymond | 52/718.1 |
| 3,387,409 | 6/1968 | Gorys et al. | 49/475.1 |
| 3,630,564 | 12/1971 | Ferrara | 296/1.1 |
| 3,977,048 | 8/1975 | Benedetti | 24/293 |
| 4,092,766 | 6/1978 | Meyer | 24/73 |
| 4,296,530 | 10/1981 | Muller et al. | 24/295 |
| 4,532,671 | 8/1985 | Endo | 16/7 |
| 4,860,402 | 8/1989 | Dichtel | 16/4 |
| 4,875,250 | 10/1989 | Chaintreuil | 16/4 |
| 4,937,126 | 6/1990 | Jackson | 428/122 |
| 4,994,311 | 2/1991 | Junker | 428/122 |
| 5,033,246 | 7/1991 | Vaughan et al. | 52/400 |
| 5,158,335 | 10/1992 | Usuta et al. | 49/476 |
| 5,192,599 | 3/1993 | Sakamoto | 16/4 |

*Primary Examiner*—Robert R. Song
*Attorney, Agent, or Firm*—Harness, Dickey & Pierce

[57] ABSTRACT

A transversely resilient retaining clip for securing a trim strip over an automobile rocker panel weld flange without requiring screws or adhesive. The trim strip is retained by the resilient clip and a weatherstrip carrier member having a recess disposed longitudinally over the flange. The resilient clip and weatherstrip member cooperate to securely retain the trim strip in a predefined spaced relationship with the weld flange such that it covers the flange and weatherstrip carrier as well as overlies the vehicle carpet.

17 Claims, 3 Drawing Sheets

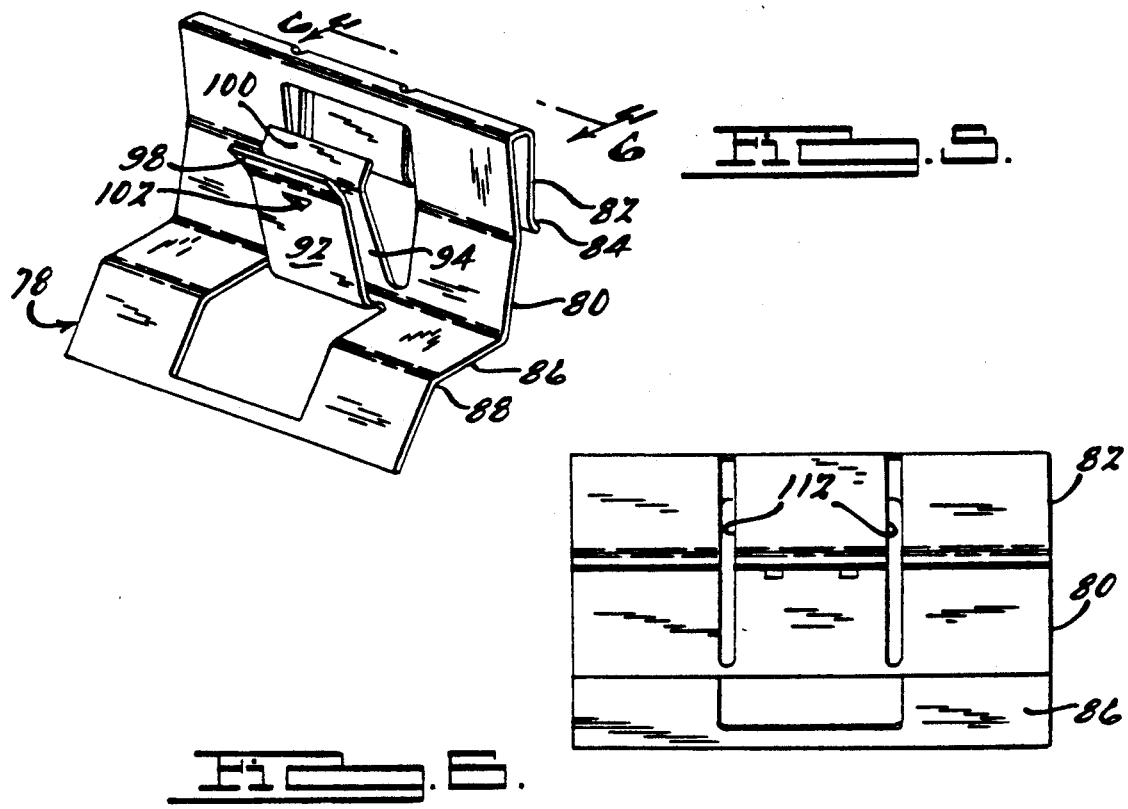
FIG. 5.
FIG. 6.
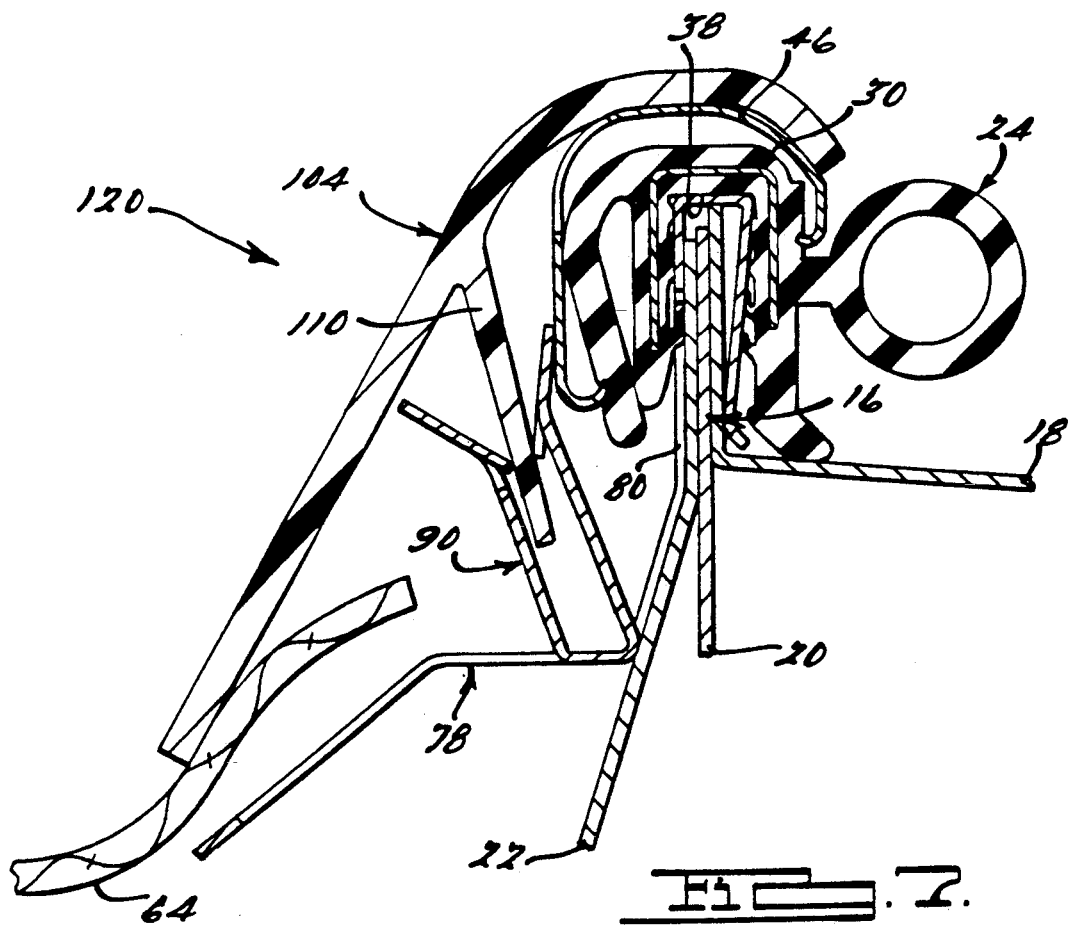
FIG. 7.

AUTOMOBILE TRIM STRIP AND CARPET RETAINING CLIP

BACKGROUND OF THE INVENTION

This invention relates generally to automobile trim components and, more particularly, to a clip for retaining a trim strip which provides a finished edge over the rocker panel pinch weld flange and the flange-mounted body seal as well as retains automobile floor covering along the lower edge of a door opening.

The joint between automobile rocker and floor panels running along the lower edge of a door opening is typically pinch welded, leaving a sharp and upwardly projecting unfinished edge. This edge must be covered by a trim strip in order to provide a finished appearance as well as to protect passengers as they enter or exit the vehicle. Conventionally, this is done using an ornamental sheet metal or plastic strip, known as a scuff plate or lower garnish molding, fastened over the upstanding joint to the rocker panel with threaded fasteners such as screws. In addition to covering the weld flange, this trim strip also secures and provides a finished trim edge for vehicle floor covering, usually carpet, along the lower edge of the door opening.

The use of screws to secure this trim strip, however, is undesirable for a number of reasons. First of all, screws make the assembly process ergonomically more complex and unforgiving. Tolerances between aligned holes must be kept tight and the assembler generally must align the holes, place a screw in each hole and then tighten each screw. Secondly, over time the screws may become loose or lost. They are also cosmetically undesirable and apt to scratch or snag items inadvertently brushed across them. Finally, it is desirable to minimize any holes drilled in the automobile rocker and floor panels since such holes negatively affect the water tightness of the vehicle. Moisture entering through the holes can eventually cause corrosion and carpet mildew.

Although some attempts have been made to reduce or eliminate threaded fasteners in this application by providing a series of individual trim strip retaining clips which are secured to the rocker panel with an adhesive, this arrangement also has drawbacks. Glued on clips may be difficult to properly align and the presence of glue at the assembly line requires specialized dispensing equipment, can be messy and may raise chemical safety issues.

There is therefore a need for a rocker trim molding which is more easily fastenable to the pinch welded flange without the necessity of holes or glue and which results in an easier assembly process. It is also desirable that such molding effectively retain and provide a trim edge for the vehicle carpet in the rocker area.

SUMMARY OF THE INVENTION

The present invention provides the above described advantages by providing a resilient retaining clip for securing a trim strip over the rocker panel weld flange securely and without requiring screws or adhesive. The trim strip is retained by the resilient clip and a weatherstrip carrier member having a longitudinally extending and downwardly directed generally U-shaped recess disposed over the weld flange. The resilient clip and a weatherstrip member cooperate to securely retain the trim strip in a predefined spaced relationship with the weld flange such that it covers the flange and weatherstrip carrier as well as overlies the vehicle carpet.

Additional objects and advantages of the present invention will become apparent to one skilled in the art upon review of the following description taken in conjunction with the accompanying drawings.

BRIEF DESCRIPTION OF THE DRAWINGS

FIG. 5 is a perspective view of the clip member of the embodiment shown in FIG. 4.

FIG. 6 is a plan view of the clip shown in FIG. 5 as viewed from line 6—6.

FIG. 7 is a cross-sectional view similar to FIGS. 2 and 4 of a third alternative preferred embodiment of the present invention.

DETAILED DESCRIPTION OF THE PREFERRED EMBODIMENTS

Figure 1:
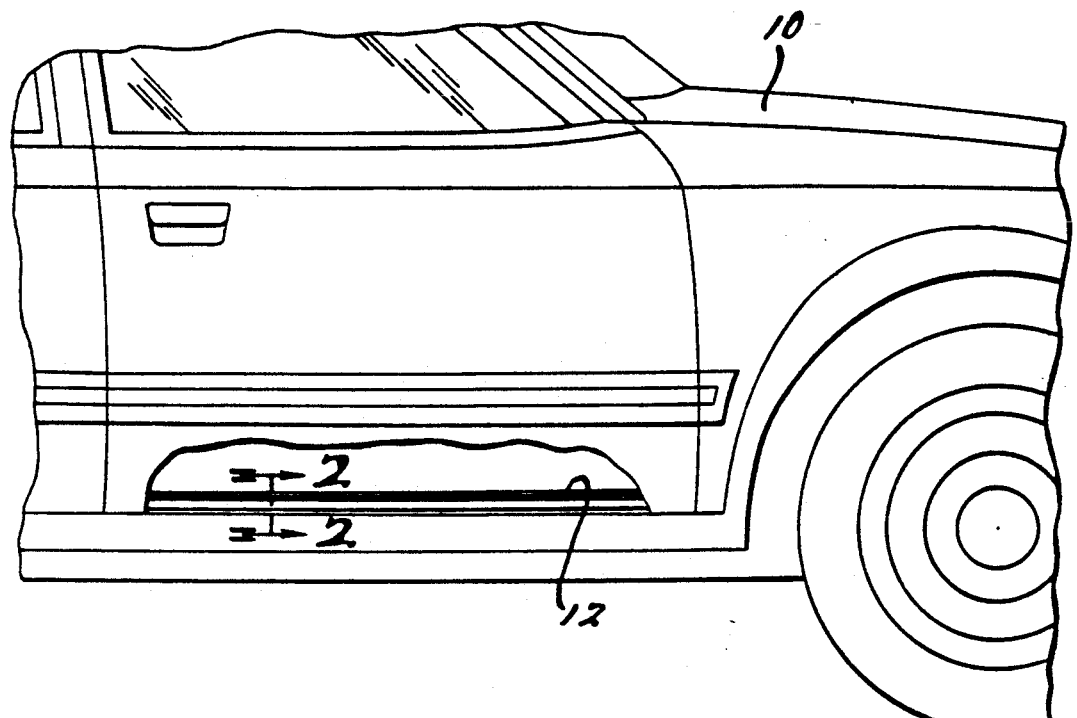
FIG. 1 is a partial side view of an automobile having a portion broken away therefrom along the rocker panel area.

Referring now to the drawings, a portion of an automobile body is shown generally at 10, with the rocker panel area 12 in which the present invention is disposed being shown in cutaway. While the rocker area 12 of FIG. 1 extends along a front door opening, the present invention is equally well suited for application along the opening for a rear door, or front and rear door combination, as well as to any other type of automotive vehicle such as a truck or van. However, vehicle 10 is preferably of a type having flange-mounted body-side weatherstrip which is used to provide a seal between the door and the vehicle door opening, and is disposed about the body opening rather than about the periphery of the door.

Figure 2:
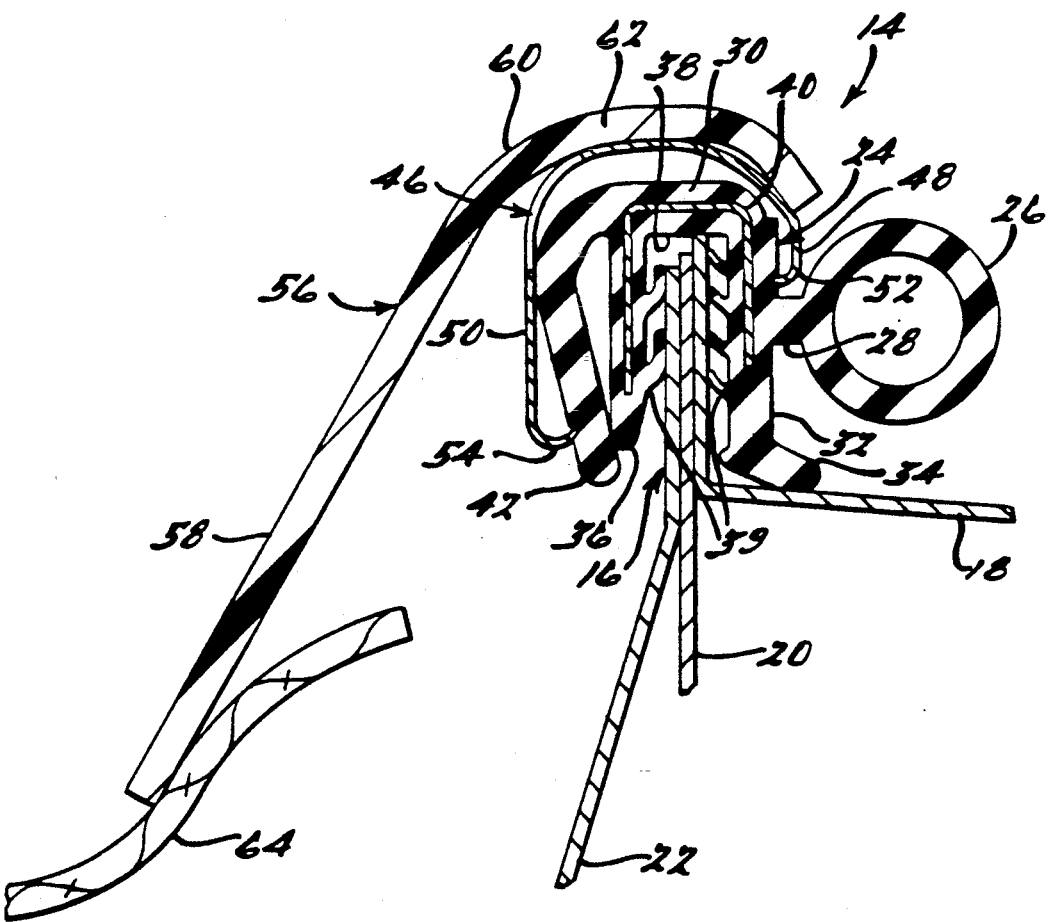
FIG. 2 is a cross-sectional view, taken generally through line 2—2 in FIG. 1.
Figure 3:
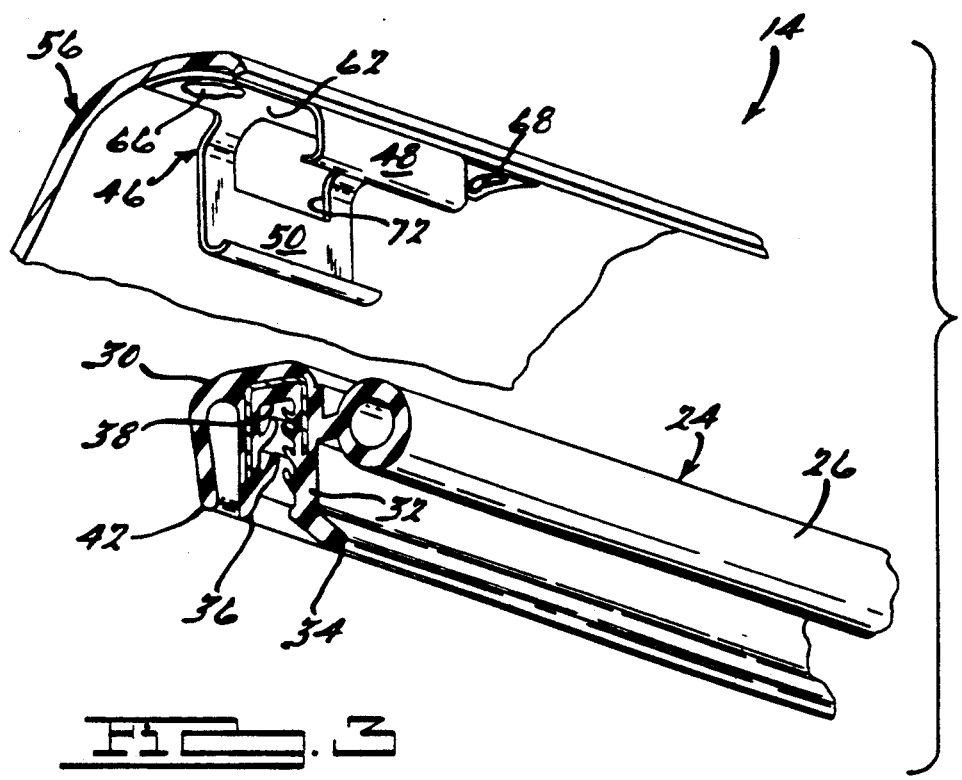
FIG. 3 is an exploded perspective view of the components of the embodiment illustrated in FIG. 2.

A first preferred embodiment of the present invention is indicated generally at 14 in FIGS. 2 and 3. As shown in the cross-sectional view of FIG. 2, this invention is adapted to cover the pinch weld flange 16 formed by the intersection of the upper portions of the vehicle's rocker outer panel 18, rocker inner panel 20 and floorpan 22. Flange 16 typically runs longitudinally along the entire length of a door opening, may be of any similar shape and may be formed by joining any number or types of separate panels, depending upon the particular vehicle design. This flange may also be of a non-constant cross-sectional shape and the flange height may vary along the length of the rocker area.

Disposed about flange 16, running substantially along the entire length thereof is a lace or weatherstrip 24 designed to seal the vehicle's passenger compartment at the door opening from outside environmental elements such as temperature, moisture, dust and noise. Weatherstrip 24 is preferably of the type shown in FIG. 2 but may alternately be of any other suitable type. Weatherstrip 24 preferably includes a hollow bulb portion 26 which may be deformably compressed between the vehicle body and the door to provide sealing engagement therebetween. Bulb 26 preferably extends via a stem portion 28 from a generally 3-legged E-shaped carrier 30.

Carrier 30 includes a first leg 32 having disposed at one end thereof a foot portion 34 adapted to act as a lip seal against rocker outer panel 18. A second leg 36 is preferably integrally formed with and spaced from leg 32, legs 32 and 36 cooperating to form a generally U-shaped downwardly directed recess 38. Each of legs 32 and 36 preferably has a series of projecting ribs 39 disposed on an inner side thereof projecting into recess 38. The distance between legs 32 and 36, not including projecting ribs 39, is preferably slightly larger than the general width of the weld flange 16 or the combined thickness of each of the adjoined panels.

A stiffening member 40, generally U-shaped in cross section and preferably made of metal or other similar rigid material, is encapsulated within carrier 30 and extends generally along the entire longitudinal length of the weatherstrip from leg 32 to leg 36. Stiffener 40 serves to add rigidity to the carrier 30 and to maintain a predetermined distance between legs 32 and 36, and allows them to effectively grip weld flange 16 and not be readily removed therefrom. Ribs 39 do not substantially inhibit forcible insertion of recess 38 onto weld flange 16 but are shaped to make removal therefrom slightly more difficult as well as to aid in providing an effective seal between the exterior and interior of vehicle 10. Weatherstrip carrier 30 also preferably includes a third leg 42, which is integrally formed with and spaced from second leg 36 on a side thereof opposite leg 32.

A transversely resilient retaining clip 46 is disposed about the E-shaped carrier 30 of weatherstrip 24, clip 46 being preferably generally C-shaped in cross section but having one shorter leg 48 and one longer leg 50. Shorter leg 48 is preferably of a length to bear against first leg 32 of weatherstrip 24 at an upper portion thereof, along the top surface of stem portion 28. Legs 48 and 50 of clip 46 are preferably spaced apart a distance which allows clip 46 to be securely fastened about the E-shaped carrier of weatherstrip 24 by pushing with a moderate degree of effort but not removable therefrom without a greater degree of force.

Leg 48 of clip 46 also preferably includes an inwardly projecting flange or lip 52 adapted to provide biting engagement with leg 32 of weatherstrip 24 to prevent clip 46 from slipping or snapping off of weatherstrip 24. Flange 52 is preferably formed so as to be positioned against the upper surface of stem 28 of lace 24. This provides a gauging feature during assembly which ensures a consistent sight line. Leg 50 also preferably includes a similar inwardly projecting flange 54, designed to more effectively grip leg 42 and to cause forcible compression of weatherstrip carrier leg 42 against leg 36.

Disposed fixably atop retaining clip 46 is an elongated trim strip 56, preferably formed of a decorative plastic material. Trim strip 56 preferably includes a transversely extending generally flat portion 58 integrally formed with a generally curved portion 60. Curved portion 60, in this preferred embodiment, is fixed to clip 46 at a center portion 62 thereof, between downwardly extending legs 48 and 50. Curved portion 60 is preferably formed so as to ornamentally cover carrier 30 of weatherstrip 24 and a proper relationship between portion 60, flange 52 and stem 28 ensures that the sealing function of bulb 26 is not compromised. When attached to clip 46 and positioned over carrier 30 and flange 16, flat portion 58 of strip 56 extends over the interior vehicle carpet 64 to retain the carpet and provide a finished edge along the door opening.

FIG. 3 shows the clip 46, trim strip 56 and weatherstrip 24 of this embodiment of the present invention in perspective view so as to more clearly illustrate the preferred shapes thereof. It will be appreciated that the shape of the clip 46 may vary somewhat depending upon the precise external shape of the weatherstrip 24.

Along a typical door opening, a series of clips 46 are preferably used to secure the elongated trim strip 56 to the longitudinally extending weatherstrip 24 and weld flange 16. As shown in FIG. 3, clip 46, if flattened, would generally be shaped as a cross, with leg portions 48 and 50 extending generally perpendicularly from center portion 62.

Portion 62 is preferably joined to curved portion 60 of trim strip 56 at at least two points, 66 and 68, but may alternately be joined at a single point, preferably near the center of portion 62. This joint may be made using a number of methods, the preferable method being heat staking. This may be accomplished by providing excess material at spaced points along trim strip 56 which project through corresponding holes formed in clip 46, this excess material being melted to achieve permanent joining. Alternately, however, trim strip 56 may be secured to clip 46 by any other suitable method known to those having skill in the art such as with screws, rivets or an adhesive.

As can be seen in FIG. 3, the longitudinal length of center portion 62 of clip 46 is preferably longer than the width of the respective leg portions 48 and 50. Also, leg 50 preferably includes an aperture 72 formed therein for slightly increased flexibility. Clip 46 is preferably stamped from a single sheet metal blank and is preferably several inches in length whereas trim strip 56 may typically extend several feet in length. Clip 46, however, could feasibly be sized so as to extend over the entire length of strip 56.

In mounting the trim strip and carpet retaining clip of the present invention at the vehicle door opening, recess 38 of weatherstrip 24 is preferably press fit onto pinch weld flange 16. Clip 46, preferably preassembled to trim strip 56 using a method discussed above is then forcibly pushed onto carrier 30 into the position shown in FIG. 2, causing legs 48 and 50 to be biased apart by carrier 30. Clip 46 thereby acts to hold trim strip 56 in a defined spaced relationship with weld flange 16 wherein the weld flange 16 and weatherstrip carrier 30 are covered by the curved portion 60 of strip 56 and flat portion 58 of strip 56 overlies and retains the vehicle carpet 64.

Figure 4:
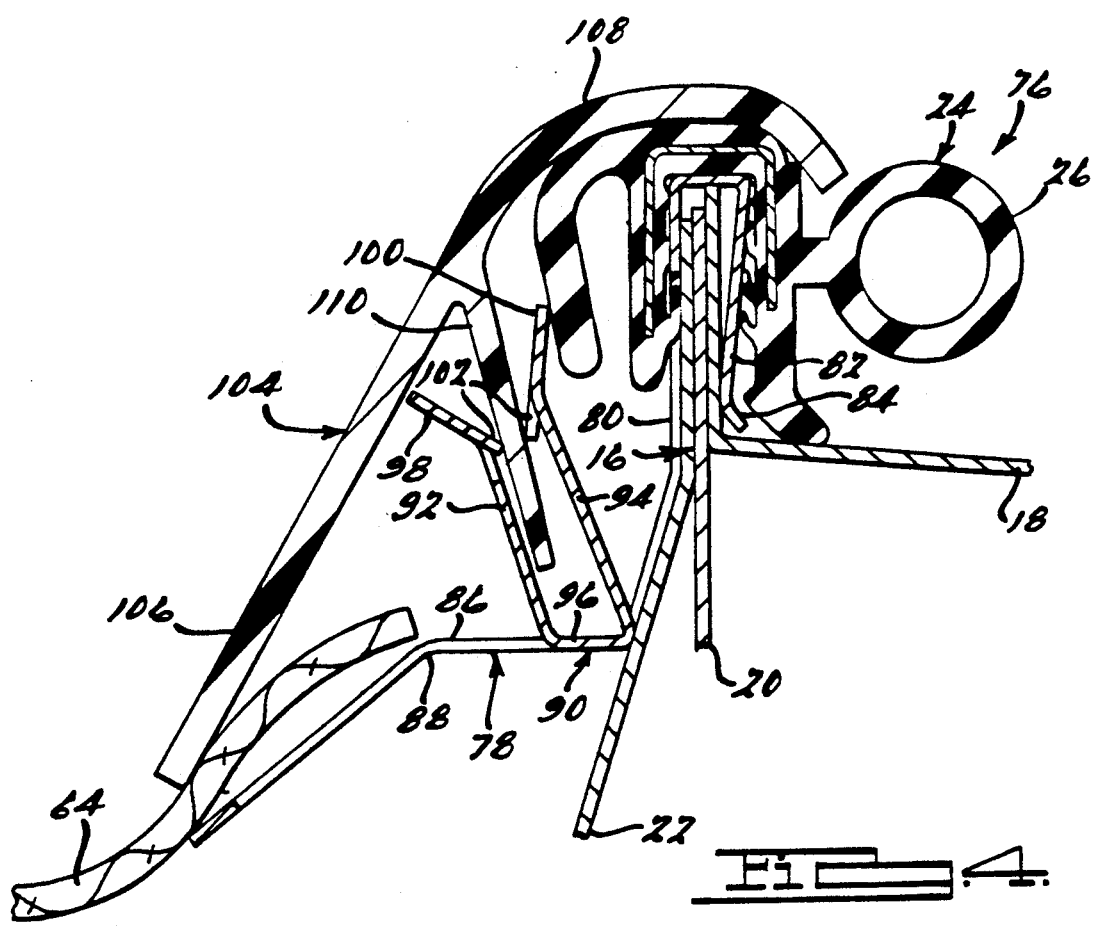
FIG. 4 is a cross-sectional view similar to FIG. 2 of an alternative preferred embodiment of the present invention.

A second alternative preferred embodiment of a trim panel and retaining clip according to the teachings of the present invention is shown in cross section generally at 76 in FIG. 4, wherein common numerals are used to refer to elements shown previously in FIGS. 1 and 2. As shown in FIG. 4, the weld flange 16 formed by the rocker inner and outer and floor panels is identical to that shown above, as is weatherstrip 24. Clip 78, however, differs in several respects from clip 46 of the first embodiment. Clip 78 is preferably formed of a single sheet of material such as metal or plastic into three main portions, each having a unique function. Consideration of the perspective view of FIG. 5 along with the cross-section of FIG. 4 will aid the reader in the understanding of the shape of clip 78.

Clip 78 includes an upper portion 80 which is formed so as to generally follow the cross-sectional contour of the upper portion of the floor panel 22 into flange 16. Portion 80, however, continues past panel 22 so as to fold over the upper unfinished edge of weld flange 16 and then extend downwardly therefrom and back toward itself in a leg 82. Leg 82 preferably includes a foot portion 84 bent slightly outwardly from the end of portion 80 so as to aid in the placement of clip 78 onto the weld flange. Recess 38 of weatherstrip 24 with this second preferred embodiment is disposed atop portion 80 of clip 78, and thereby securely holds clip 78 in place over the weld flange 16. If environmental conditions warrant, a sealant may also be applied between U-shaped portion 80 and the top of the weld flange 16. The seal created thereby would enhance or replace the sealing effect of ribs 39.

Extending from upper portion 80, away from floor panel 22, is a second portion 86 of clip 78. Portion 86 may be generally straight or may include a slight bend 88, depending upon the particular configuration of the vehicle in this area. Portion 86 is preferably formed to provide structural support underneath the vehicle carpet 64 as shown in FIG. 4 and to substantially eliminate the need for any auxiliary carpet support member.

Formed from part of portions 80 and 86 of clip 78 is a third portion 90. Portion 90 is generally U-shaped in cross section, as shown best by FIG. 4. Portion 90 includes two legs 92 and 94, separated by a bridge portion 96. The intersection of bridge 96 and upper portion 80 of clip 78 preferably contacts floor panel 22 for lateral support. The distance between legs 92 and 94 decreases from bridge 96 to a point roughly three quarters up each leg wherein each of legs 92 and 94 is bent away from one another to form outwardly directed flanges 98 and 100. At the junctures between flanges 98 and 100 and straight portions of each leg 92 and 94 is preferably formed at least one inwardly extending prong 102.

Trim strip 104 in this second preferred embodiment is formed in a manner similar to strip 56 discussed above, having a generally flat portion 106 and a curved portion 108. Trim strip 104, however, further includes a downwardly extending and slightly tapered fin 110 extending at an acute angle from flat portion 106 and adapted to be receivingly engaged by legs 92 and 94 of portion 90 of clip 78. Prongs 102 further act to securely retain fin 110 therein.

Flat portion 106 of trim strip 104, at the end thereof, preferably cooperates with portion 86 so as to secure the vehicle carpet 64 along the door opening edge. By controlling the shapes of clip 78 and trim strip 104 so that the distance between the end of portion 106 and clip portion 86 is slightly less than the general thickness of carpet 64, the carpet 64 is thereby firmly supported and securely held in place. Additionally, the open area between portion 86 of clip 78 and floorpan 22 provides a convenient space through which wiring running fore and aft through the passenger compartment may be placed.

Shown best by the perspective view of FIG. 5, clip 78 is preferably formed from a single piece of plastic or sheet metal blank which has been bent upwardly and over to form portion 80 and leg 82. Portion 86 is similarly formed. The structure of portion 90 is preferably constructed by punching out an interior part of portions 80 and 86 and bending these parts together to form legs 92 and 94. Elongated slots 112 formed through leg 82 of portion 80 produce three independent spring fingers to accommodate inherent variations in the weld flange 16. It will be appreciated that the precise shape of the clip 78 may also vary somewhat depending on the precise shape of the weld flange and its component pieces.

In mounting the trim panel of this embodiment to the vehicle body, portion 80 of clip 78 is first secured atop weld flange 16. Recess 38 of weatherstrip 24 is then secured over clip 78. Trim panel 104 is finally attached by forcing tapered fin 110 between legs 92 and 94 of clip portion 90. A number of clips 78 may be spaced along weld flange 16 to engage trim strip 104 and weatherstrip 24 but clip 78 may alternately be formed to encompass the entire length of trim strip 104.

Indicated at 120 in FIG. 7 is a third alternative preferred embodiment of the present invention, essentially a combination of the first two embodiments discussed above. Embodiment 120 includes both clips 46 and 78. Trim strip 104 from FIG. 4 having tapered fin 110 is used but strip 104 is also fixably secured to clip 46 in the manner discussed above regarding strip 56.

In this exemplary embodiment, portion 80 of clip 78 is secured over weld flange 16 and recess 38 of weatherstrip carrier 30 is then forced onto portion 80 and flange 16. Trim strip 104, preassembled to clip 46, is mounted by positioning fin 110 into portion 90 of clip 78 while resiliently securing clip 46 over weatherstrip carrier 30. This embodiment provides increased support for trim strip 104 over weld flange 16.

The retaining clip and trim strip of the present invention, according to any of the various embodiments discussed above, provides significant advantages over previous rocker area trim members. By utilizing the weatherstrip carrier and specially designed resilient clips in conjunction with a suitable trim panel, the screws, holes and glue traditionally used to secure a trim panel to the rocker weld as well as the disadvantages associated therewith have been substantially eliminated. Furthermore, the trim strip and retaining clip combination is stable and secure when installed. It also allows for some lateral adjustment during assembly, not possible with screws, and allows the trim strip to be evenly secured over its length. Finally, since screws are not required, the various preferred embodiments of the present invention enable assembly and precise positioning of a trim strip much quicker than heretofore possible when using conventional screws. In large scale automotive assembly applications the cost savings in labor and materials is anticipated to be significant.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

I claim:

1. An automobile trim component for securing to an upstanding rocker panel weld flange extending longitudinally along the lower edge of a vehicle door opening wherein said weld flange is adapted to be covered by a weatherstrip member extending longitudinally over said weld flange, said weatherstrip member including a carrier having a longitudinally extending downwardly directed recess formed therein, said weld flange being disposed in said recess, said trim component comprising:

an elongated trim strip, said trim strip including a generally transversely extending substantially flat portion adapted to overlie an edge of vehicle floor covering; and a transversely resilient clip member, said clip member engaging said weatherstrip carrier and said trim strip so as to securely retain said trim strip in a position overlying said weld flange, said weatherstrip carrier and said floor covering.

2. The trim component of claim 1 wherein said trim strip includes a generally curved portion integrally formed with said substantially flat portion, said clip member being fixedly secured to said curved portion.

3. The trim component of claim 2 wherein said clip member includes two legs spaced from one another so as to be biased apart when engaging said weatherstrip carrier.

4. The trim component of claim 3 wherein each said leg includes an inwardly projecting lip, each said lip adapted to providing biting engagement into said weatherstrip carrier.

5. The trim component of claim 1 wherein said clip member includes a downwardly directed generally U-shaped upper portion adapted to fit over said weld flange, said recess of said weatherstrip being secured over said clip member upper portion.

6. The trim component of claim 1 wherein said clip member includes means for supporting said vehicle floor covering underneath said substantially flat portion of said trim strip.

7. The trim component of claim 1 wherein said trim strip includes a projecting fin and said clip member includes means for retentively engaging said fin.

8. The trim component of claim 7 further comprising a second clip member, said second clip member being generally C-shaped in cross section and fixedly secured to said trim strip, said second clip member including two legs adapted to be biased apart by forcible insertion of said second clip member over said weatherstrip carrier.

9. The trim component of claim 8 wherein each said leg includes an inwardly projecting lip, each said lip adapted to providing biting engagement into said weatherstrip carrier.

10. An automobile trim component for cooperating with an upstanding rocker panel weld flange extending longitudinally along the lower edge of a vehicle door opening, wherein a weatherstrip member extends longitudinally over said weld flange, said weatherstrip member including a carrier having a longitudinally extending downwardly directed recess formed therein, said trim component comprising:

an elongated trim strip having a longitudinally extending and generally downwardly projecting fin; and a transversely resilient clip member having a generally U-shaped upper portion adapted to be disposed over said weld flange, said recess of said weatherstrip fitting over said U-shaped portion of said clip, said clip further comprising means for retentively engaging said trim strip fin.

11. The trim component of claim 10 wherein said trim strip includes a curved portion and a generally flat portion, said fin being disposed intermediate said curved and flat portions, and said clip adapted to secure said curved portion over said weatherstrip carrier and said flat portion over an edge of vehicle floor covering.

12. The trim component of claim 11 wherein said clip further comprises means for supporting said edge of vehicle floor covering, said clip securely retaining said trim strip in a spaced relationship with said weld flange such that said floor covering is clamped securely between said support means and said trim strip.

13. The trim component of claim 10 wherein said means for retaining includes a pair of opposing legs transversely biased toward one another, said legs disposed intermediate said support means and said upper portion of said clip.

14. An automobile trim component for covering an upstanding rocker panel weld flange extending longitudinally along the lower edge of a vehicle door opening, comprising:

a weatherstrip member extending longitudinally over said weld flange, said weatherstrip member including a carrier having a longitudinally extending downwardly directed recess formed therein, said weld flange being disposed in said recess;

an elongated trim strip;

a transversely resilient clip member fixedly attached to said trim strip, said clip member adapted to be resiliently mounted about said carrier and said flange so as to securely retain said trim strip in a predetermined spaced relationship with said weld flange.

15. The trim component of claim 14 wherein said clip is generally C-shaped in cross section having a pair of legs extending downwardly from a center section, each said leg having an inwardly projecting lip to inhibit removal of said clip from said carrier.

16. The trim component of claim 15 wherein said weatherstrip carrier biases said clip legs apart.

17. The trim component of claim 15 wherein said elongated trim strip includes a generally curved portion and a generally flat portion extending transversely therefrom and wherein said clip is secured to said trim strip at said curved portion and said flat portion extends to overlie vehicle floor covering.

* * * * *